Jan. 30, 1945. V. B. OLSEN 2,368,423
THERMO-DYNAMIC CONVERSION IN COMPRESSION-IGNITION ENGINES
Filed Sept. 24, 1942
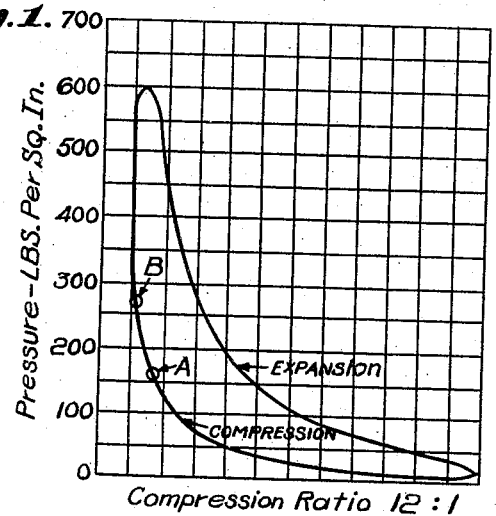
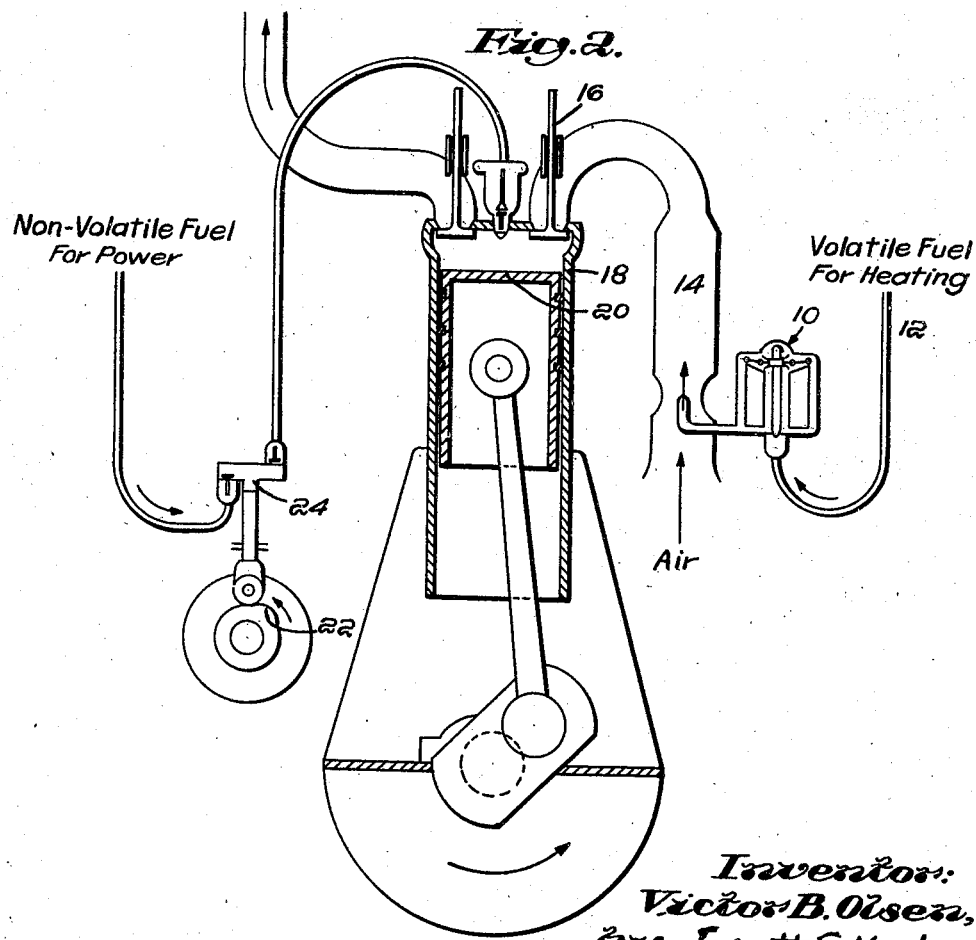
Inventor:
Victor B. Olsen,
by Everett E. Kent
Attorney Patented Jan. 30, 1945

2,368,423

UNITED STATES PATENT OFFICE 2,368,423

THERMODYNAMIC CONVERSION IN COMPRESSION-IGNITION ENGINES

Victor B. Olsen, Everett, Mass.

Application September 24, 1942, Serial No. 459,507

7 Claims. (Cl. 123—1)

This invention relates to improvements in thermo-dynamic conversion in compression-ignition engines.

More particularly it relates to improving the conversion of non-volatile liquid fuel in engines, commonly called Diesel engines, which by compression raise the temperature of a charge of air so that fuel subsequently injected ignites spontaneously.

Large engines of this type have an acceptable efficiency of heat conversion and a smoothness of operation which have never been attained in small high speed engines of the same type which are much desired for aeroplanes, land vehicles and small boats and for other uses.

It is a recognized fact that compression ignition difficulties increase with any decrease in cylinder size.

It is also a recognized fact that compression ignition difficulties increase as the revolutions per minute are increased.

The increased difficulties in the first case are due to losses of heat from the compressed air. Such losses increase with any increase in the surface-to-volume ratio of the engine cylinder.

The increase of difficulties in the second case is due to the decrease in time available for execution of the ignition and combustion process. The available time decreases with increase of the rate of revolution.

When ignition does not occur simultaneously with the beginning of fuel injection, unburned fuel accumulations develop in the combustion chamber during the interval between the introduction of the fuel and its primary ignition. These accumulations of unburned fuel are the principal cause of uncontrolled or ragged combustion as found in high speed compression ignition engines hitherto made and operated. High speed compression ignition engines of moderate size cannot be truly efficient until these difficulties have been mastered completely.

It is my conviction that present known types of high speed compression ignition engines do not attain the desired smoothness of operation because of improper ignition and combustion control conditions, and that these faulty ignition and combustion control conditions are caused primarily by the inability of the engine to develop, by its compression process, the high temperature required for timely ignition of the fuel supplied. The temperature attained by the heat of compression, in engines of this type, is usually higher than the spontaneous ignition temperature of the fuel supplied; but I believe that the rate of heat transfer from the heated air to the relatively cool injected fuel is not great enough to provide the extreme rapidity of ignition required for high speed operation. Ignition of the fuel being thus delayed while the fuel is being fed into the combustion chamber in a steady stream, fuel accumulations develop. When ignition eventually occurs, these accumulations burn very rapidly with a resultant severe rate of uncontrollable pressure rise. It is these conditions which in present practice require heavy construction; tend to place limitations upon the speed (R. P. M.) of engines of this type; and burn their fuel with low efficiency of conversion to power.

For fuel having a spontaneous ignition temperature of 600° F. a maximum compression temperature of 900°–1000° F. has been considered sufficient. The fuel injection timing must be advanced somewhat to allow time for the aforementioned transfer of heat; and this means that injection of the fuel commences before the compression temperature has attained its maximum. Therefore, in present practice fuel injection actually commences at a time when the compression temperature is considerably lower than that which is deemed to be sufficient.

In engines of the smaller sizes the cooled cylinder walls withdraw heat from the chamber contents relatively faster than in the larger sizes, because their surfaces have a relatively larger area exposed to absorb heat, as well as being nearer to the core of the air. It results that ignition is delayed at the very time when it ought to be expedited.

It is an object of my invention to provide a method to master the conditions that cause said difficulties. Specifically, the invention provides a method for producing the required ignition temperature, and more, in spite of the augmentations of heat losses that afflict the smaller cylinders, and notwithstanding the abbreviated times that attend the higher speeds.

It is a further object to provide a method of conversion that will operate smoothly and with good efficiency, in small high speed engines. However, that which the invention provides may be found advantageous even in engines of larger sizes.

These objects are attained, generically, by adding a measured and controlled quantity of heat to the air charge during its compression, thereby to raise the compression-stroke-temperature to a height which produces ignition of the fuel charge with requisite promptness when that fuel is introduced.

Heat is to be thus added to the air charge by the combustion of a volatile fuel having a spontaneous ignition temperature low enough to permit it to become ignited spontaneously when the volume of the engine cylinder has been reduced to approximately a sixth or seventh of its original volume, or even less. The volatile fuel thus to be ignited will first have become intimately mixed with the air charge, by any suitable means, during the intake stroke or early in the compression stroke. After this ignition the compression process is to proceed until the cylinder volume has been reduced approximately to one-ninth or tenth, at which time introduction of the fuel charge of the cycle will commence. The combustion of the volatile fuel adds heat to the air, in the interval between its spontaneous ignition and the entry of the fuel charge of the cycle. That fuel charge will be ignited solely by the heated air, without especial dependence upon the heat of previous cycles, flame, electric spark, or other means of ignition.

The method thus outlined preferably does not continue into the main fuel combustion process of the cycle, nor does it function to keep the engine operating when power is not being demanded. The sole objective being to minimize the ignition lag, the volatile fuel will have made its contribution to the temperature when the injection of power fuel begins. The dynamic effect of its combustion is initially to oppose the piston. It is true that the energy thus used is recovered on the outstroke, subject to losses; but the object and utility of the volatile fuel is to produce heat, not force; and the quantity and timing of the volatile fuel are such that an engine designed for the execution of this process could not drive itself solely by means of the volatile fuel added to the air charge.

The timing of the combustion of volatile fuel is controlled by selecting a kind of volatile fuel which has the desired spontaneous ignition temperature, coupled with a proper degree of volatility. Such fuel is found among the pure hydrocarbons. An example is straight run gasoline, as distinguished from gasoline made by a cracking process that takes some hydrogen from the molecules and makes them more difficult to rupture, less avid to combine with the oxygen of the compressed air. For this reason neither ether or alcohol nor any substance having oxygen is recommended, unless the likelihood of igniting soon enough is known, as well as its volatility. The fuel need not be entirely composed of equal hydrocarbons. A fuel having a suitable definite distillation range would be satisfactory; and this need not be an expensive fuel. The suitability of any particular volatile fuel can be ascertained by knowing or testing its action under the conditions to which it will be expected to respond.

The measure of volatile fuel to be introduced is controlled by the setting of the carburetor so that the quantity predetermined as sufficient to supply the needed heat will be drawn in. In general the quantity required will make only a weak mixture, too weak to propagate flame. When its spontaneous ignition occurs the combustion will be very quick, for it does not depend upon and have to wait for flame propagation. The mixture will ignite spontaneously at numerous points simultaneously, wherever the temperature of the charge has been raised to the required point. Any degree of heat transference will tend to raise the temperature of all of the gases present. Yet the combustion will not be instantaneous, nor will it necessarily cause shock, because there are temperature differences in various parts of the air charge during its compression. Ignition will first occur at the core of the charge; and as the compression process proceeds ignition will take place gradually throughout the mass, ending at the outer edges where the late addition of heat will be most helpful. Also the differences in molecular composition of the compounds in a range of distillation will spread the time of combustion slightly, tending toward avoidance of shock.

Ignition by positive means, as by a spark, is not recommended. A mixture having the much greater richness requisite for that would produce a bad effect, if its combustion were to occur before the end of the compression stroke.

In the operation of the engine and conversion-method herein proposed, the presence of the volatile fuel throughout the air during the whole of the compression stroke results in that fuel becoming heated as rapidly as the air, so that wherever the spontaneous-ignition temperature is reached the whole of this volatile fuel there burns rapidly. By choosing a volatile fuel whose spontaneous-ignition temperature is so high as to be in the region of 750° F. one may defer the instant for the ignition of that fuel until close to the instant when introduction of the non-volatile fuel is to begin. The quick combustion of the volatile fuel, just before the non-volatile fuel comes in, introduces heat that makes the temperature much higher than would result from compression alone, and this enhancement of the temperature of the medium into which the non-volatile fuel is then introduced expedites the rate of flow of heat into that fuel. The rate of heat absorption of the latter, to the stage of its ignition, may be made even more rapid by using non-volatile fuel of a variety whose spontaneous-ignition temperature is relatively low for example, in the range of 500°–700° F., which is below that suggested for the volatile fuel.

The method thus described can be practiced in an engine of any of numerous compression-ignition types already known, working on either a two-stroke or a four-stroke cycle, with whose air-intake passage there is combined a carburetor or other suitable means of introducing and dispersing volatile fuel in the intaken air.

It is one advantage of the invention that the attaining of the necessary ignition temperature by adding heat in the method described eliminates the necessity for making the engine with an extremely high compression ratio in the effort to attain prompt ignition; but high compression can be used if desired.

In the effort to attain high combustion efficiency in compression-ignition engines, the chief factor causing trouble is the ignition lag. Recognizing that ignition cannot take place until some molecules of the fuel have absorbed enough heat to become ruptured, it is seen that the lag of ignition is essentially the length of time required for the fuel to absorb the required heat. Therefore combustion efficiency will be increased by any process having a tendency to hasten the heating to the stage of molecular disruption. Thus the speeding up of the absorption of heat by the introduced charge of non-volatile fuel which the invention provides, tends toward a decreasing of the ignition lag, and so raises the combustion efficiency.

In the accompanying drawing:

Figure 1 is a theoretical indicator card showing pressure-volume relations during the compression and expansion strokes of a four-cycle engine working in the method of the invention; and Figure 2 is a diagram of a compression ignition engine for working the heat-force conversion.

The drawing represents an example of the working of the process. Figure 2 shows a carburetor 10 whose controls are to be adjusted so that on the intake stroke of piston 20 a predetermined small quantity of the selected volatile fuel will be drawn from a supply source 12, through the intake manifold 14, which may serve a multiplicity (not shown) of cylinders similar to the cylinder 18, to be drawn into each in turn through its air intake valve 16, to become well mixed with the air in the cylinder during the out-and-in strokes of the piston 20, and, in this well mixed state, to be ignited by the rise of temperature, to 750°, for example which results from compression as the end of the illustrated in-stroke is approached, for example at about 30° before the inner dead center. If the compression ratio of full stroke is 12 to 1, as represented in Figure 1, the piston at this point will still have one-fifteenth or so of stroke left to go, during which the well mixed volatile fuel can complete its combustion, for at this stage the piston is travelling relatively slowly. This combustion will use only a little of the air, but will introduce heat that sharply boosts the temperature, replacing heat lost because of the unfavorable proximity and ratio of area of walls to volume of contents. For example, the boost may be from a 750° that would not transfer heat fast enough to ignite the injected non-volatile fuel as it enters, to an approximate 1200°, a temperature more than sufficient. This injection may be forced by the cam 22 operating pump 24, during, for example, the fifteen degrees from 8° before to 7° after the dead center at inward end of stroke. Because of the high temperature and the ubiquitous distribution of the recent combustion, the heat transfer to the injected fuel will be rapid enough to ignite the non-volatile fuel and cause it to burn in a regular manner as it enters. The indicator card, Figure 1, represents this, the curves shown being an arbitrary representation of what an actual card may reasonably be expected to show. The point A at 30° as previously mentioned, being just before inward dead center, as represented in Figure 1, is at a favorable place in the compression stroke for the volatile fuel in the air charge to become ignited spontaneously, the carburetor 10 having seen set so that the combustion of the quantity of volatile fuel present will be sufficient to raise the prevailing temperature, kept down too low by the large heat losses. The assumed 750° is below any temperature at which ignition of injected non-volatile fuel would be sufficiently rapid, while the 1200° to which the combustion boosts the temperature is more than sufficient.

By this means the transfer of heat from air to entering power fuel is so rapid that ignition occurs before large accumulations of unburned non-volatile fuel can develop in the combustion chamber. Combustion of the non-volatile fuel is completed gradually and yet with such speed that the inherent heat energy of the fuel will be liberated and utilized at and shortly after the end of the compression stroke.

It is my belief that the practice of this method in a suitably designed engine will therefore accomplish the following seven improvements over the heat-force conversion experience obtainable with any high speed compression-ignition system hitherto known:

(a) Decreased ignition lag.
(b) Higher degree of combustion control.
(c) Lower maximum combustion pressures.
(d) Lower required compression ratio.
(e) Increased efficiency.
(f) Decreased torsional stress.
(g) Smoother operation.

Other resulting advantages are that the engine can be designed with less weight per horse power because of freedom from present extraordinarily high stresses likely to be experienced in operation; also with less of weight because of the ability to run at higher speed. A result of fundamental importance is that the invention makes it possible to design small high speed compression-ignition engines that will be practicable and reliable.

I claim as my invention:

1. A method of thermo-dynamic conversion, for engines whose working includes the compressing of air for the ignition and combustion of non-volatile fuel, comprising the dispersing of a volatile fuel throughout the air charge, the ratio of quantity of volatile fuel to quantity of air making a mixture of less richness than would be required for flame propagation; burning that volatile fuel by spontaneous ignition from the heat of compression while the air charge is being compressed, thereby boosting the temperature of the air charge above that resulting from its compression; followed by introduction and spontaneous ignition of the non-volatile fuel in the air charge at a boosted temperature thereof.

2. A method as in claim 1, further characterized in that injection of non-volatile fuel begins before the end of the compression stroke, and that the quantity, time of ignition and rate of combustion of the volatile fuel are such that before the end of said compression stroke the combustion of volatile fuel raises the temperature in the air charge sufficiently for spontaneous ignition of the non-volatile fuel to occur at or before the beginning of the expansion stroke.

3. A method as in claim 1, further characterized in that the extent of the boosting of temperature of air is controlled by controlling the rate of inflow of volatile fuel during air intake.

4. A method of thermo-dynamic conversion, for engines whose working includes the compressing of air for the ignition and combustion of non-volatile fuel, comprising the dispersing, throughout the air charge, of a volatile fuel having a spontaneous ignition temperature low enough for it to become ignited spontaneously and be consumed during the compressing before introduction of the non-volatile fuel commences, thus burning the volatile fuel during the compression and boosting the temperature which is available in the air for transfer of heat to and ignition of the non-volatile fuel; followed by injection of the non-volatile fuel.

5. A method as in claim 4 in which the volatile fuel is a hydro-carbon.

6. A method as in claim 4 in which the volatile fuel is straight run gasoline.

7. A method as in claim 4, in which the non-volatile fuel is a fuel having a spontaneous ignition temperature in the range of 500°–700° F.; the volatile fuel is one having a spontaneous ignition temperature not higher than 750° F.; and the air temperature required for rapid combustion of the non-volatile fuel at differing engine speeds and loads may be produced and controlled by varying the said quantity of volatile fuel per charge.

VICTOR B. OLSEN.